US009469264B2

(12) United States Patent
Nagwanshi et al.

(10) Patent No.: US 9,469,264 B2
(45) Date of Patent: Oct. 18, 2016

(54) POLYMER, ENERGY ABSORBER RAIL EXTENSION, METHODS OF MAKING AND VEHICLES USING THE SAME

(71) Applicant: SABIC Global Technologies B.V., Bergen op Zoom (NL)

(72) Inventors: Dhanendra Kumar Nagwanshi, Wixom, MI (US); Arunachala Parameshwara, Bangalore (IN); Shingo Imai, Ann Arbor, MI (US); Matthew D. Marks, Waterford, MI (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/750,531

(22) Filed: Jun. 25, 2015

(65) Prior Publication Data

US 2015/0291112 A1 Oct. 15, 2015

Related U.S. Application Data (63) Continuation of application No. 13/745,180, filed on Jan. 18, 2013, now Pat. No. 9,067,550.

(51) Int. Cl.
*B60R 19/34* (2006.01)
*B60R 19/22* (2006.01)
(Continued)

(52) U.S. Cl.
CPC ............. *B60R 19/22* (2013.01); *B60R 19/023* (2013.01); *B60R 19/34* (2013.01); *B60R 19/38* (2013.01); *F16F 7/121* (2013.01); *B60R 2019/1866* (2013.01)

(58) Field of Classification Search
CPC ....... B60R 19/02; B60R 19/18; B60R 19/34; B60R 19/22; B60R 19/023; B60R 2019/24; B60R 2019/26; B60R 2019/262
USPC ................. 293/133, 155; 296/187.09, 187.1, 296/203.01, 203.02, 193.09, 187.05, 296/187.11; 188/371, 376, 377
See application file for complete search history.

(56) References Cited

U.S. PATENT DOCUMENTS

| 3,162,745 A | 12/1964 | Rohr |
| 3,633,934 A | 1/1972 | Wilfert |

(Continued)

FOREIGN PATENT DOCUMENTS

| DE | 102007038087 A1 | 2/2009 |
| DE | 102011104368 A1 | 3/2012 |

(Continued)

OTHER PUBLICATIONS

European Patent No. 0661198 (A1); Publication Date: Jul. 5, 1995; Abstract Only; 2 Pages.

(Continued)

*Primary Examiner* — Dennis H Pedder
(74) *Attorney, Agent, or Firm* — Cantor Colburn LLP (57) ABSTRACT

In one embodiment, a rail extension comprises: an energy absorber comprising a polymer body, wherein the energy absorber comprises cells formed by cell walls extending a length of the energy absorber and forming cavities therethrough; each side of the energy absorber comprises an open channel wherein the channel is defined by walls of adjacent cells; a vehicle attachment tab extending from at least one of the cell walls at one end of the energy absorber; and a first vehicle attachment tab gusset extending between the vehicle attachment tab and the cell wall on one side of an opening in the vehicle attachment; wherein the energy absorber and the vehicle attachment tab were formed as one-piece.

19 Claims, 8 Drawing Sheets

(51) Int. Cl.
*F16F 7/12* (2006.01)
*B60R 19/02* (2006.01)
*B60R 19/38* (2006.01)
*B60R 19/18* (2006.01)

(56) References Cited

U.S. PATENT DOCUMENTS

| | | | |
|---|---|---|---|
| 3,842,944 A | 10/1974 | Shiotani et al. | |
| 3,887,223 A * | 6/1975 | Bez | B60R 19/34 188/371 |
| 4,227,593 A | 10/1980 | Bricmont et al. | |
| 4,890,877 A | 1/1990 | Ashtiani-Zarandi et al. | |
| 5,139,297 A | 8/1992 | Carpenter et al. | |
| 5,150,935 A | 9/1992 | Glance et al. | |
| 5,306,066 A | 4/1994 | Saathoff | |
| 5,480,729 A | 1/1996 | Hattori et al. | |
| 5,618,074 A | 4/1997 | Weast | |
| 5,715,917 A | 2/1998 | Smallwood | |
| 5,746,419 A | 5/1998 | McFadden et al. | |
| 5,819,408 A | 10/1998 | Catlin | |
| 6,299,958 B1 | 10/2001 | St. Julien et al. | |
| 6,394,512 B1 | 5/2002 | Schuster et al. | |
| 6,467,822 B1 | 10/2002 | Leng | |
| 6,494,510 B2 | 12/2002 | Okamura et al. | |
| 6,503,585 B1 | 1/2003 | Wagenblast et al. | |
| 6,513,843 B1 | 2/2003 | Frederick et al. | |
| 6,540,275 B1 | 4/2003 | Iwamoto et al. | |
| 6,547,295 B2 | 4/2003 | Vismara | |
| 6,685,243 B1 | 2/2004 | Evans | |
| 6,866,294 B2 | 3/2005 | Horsch et al. | |
| 6,866,331 B2 | 3/2005 | Kropfeld | |
| 6,905,136 B2 | 6/2005 | Vidal et al. | |
| 6,938,936 B2 | 9/2005 | Mooijman et al. | |
| 7,004,502 B2 | 2/2006 | Borroni-Bird et al. | |
| 7,044,514 B2 | 5/2006 | Mustafa et al. | |
| 7,086,690 B2 | 8/2006 | Shuler et al. | |
| 7,134,700 B2 | 11/2006 | Evans | |
| 7,163,243 B2 | 1/2007 | Evans | |
| 7,222,896 B2 | 5/2007 | Evans | |
| 7,434,872 B2 | 10/2008 | Steller | |
| 7,517,006 B2 | 4/2009 | Kageyama et al. | |
| 7,520,561 B2 | 4/2009 | Nakamae et al. | |
| 7,597,383 B2 | 10/2009 | Itou | |
| 7,607,720 B2 | 10/2009 | Noyori et al. | |
| 7,699,383 B2 | 4/2010 | Fukukawa et al. | |
| 7,806,448 B2 | 10/2010 | Allen et al. | |
| 7,879,435 B2 | 2/2011 | Mett et al. | |
| 8,322,780 B2 | 12/2012 | Nagwanshi et al. | |
| 8,469,417 B2 | 6/2013 | Di Modugno | |
| 8,474,583 B2 | 7/2013 | Nagwanshi et al. | |
| 8,864,216 B2 | 10/2014 | Nagwanshi et al. | |
| 8,905,444 B2 * | 12/2014 | Zannier | F16F 7/121 293/132 |
| 2001/0026072 A1 | 10/2001 | Sato et al. | |
| 2002/0017805 A1 | 2/2002 | Carroll, III et al. | |
| 2002/0043809 A1 | 4/2002 | Vismara | |
| 2002/0050413 A1 | 5/2002 | Renault | |
| 2002/0070584 A1 | 6/2002 | Carroll, III et al. | |
| 2002/0125725 A1 | 9/2002 | Satou | |
| 2002/0129981 A1 | 9/2002 | Satou | |
| 2002/0180223 A1 | 12/2002 | Vismara et al. | |
| 2003/0034658 A1 | 2/2003 | Cate et al. | |
| 2003/0067179 A1 | 4/2003 | Bastien et al. | |
| 2003/0164618 A1 | 9/2003 | Gentle | |
| 2004/0051321 A1 | 3/2004 | Hanai et al. | |
| 2004/0124643 A1 | 7/2004 | Matsumoto et al. | |
| 2004/0174025 A1 | 9/2004 | Converse et al. | |
| 2006/0119116 A1 | 6/2006 | Goertz | |
| 2006/0181089 A1 | 8/2006 | Andre et al. | |
| 2007/0122510 A1 | 5/2007 | Mendiboure et al. | |
| 2008/0246277 A1 | 10/2008 | Gallagher et al. | |
| 2008/0286522 A1 | 11/2008 | Khan et al. | |
| 2009/0160203 A1 | 6/2009 | Garg et al. | |
| 2009/0309387 A1 | 12/2009 | Goral et al. | |
| 2010/0244472 A1 | 9/2010 | Gonin et al. | |
| 2011/0316307 A1 | 12/2011 | Di Modugno | |
| 2012/0112479 A1 | 5/2012 | Nagwanshi et al. | |

FOREIGN PATENT DOCUMENTS

| | | |
|---|---|---|
| EP | 0661198 A1 | 7/1995 |
| EP | 1065108 A2 | 1/2001 |
| EP | 1300293 A9 | 4/2003 |
| EP | 1369309 A1 | 12/2003 |
| EP | 1419936 A1 | 5/2004 |
| EP | 1652733 A1 | 5/2006 |
| EP | 1759959 A2 | 3/2007 |
| EP | 2380782 A1 | 10/2011 |
| FR | 2702432 A1 | 9/1994 |
| FR | 1473197 A1 | 11/2004 |
| FR | 2859970 A1 | 3/2005 |
| FR | 2864811 A1 | 7/2005 |
| FR | 2887508 A1 | 12/2006 |
| FR | 2890361 A1 | 3/2007 |
| GB | 2384217 A | 7/2003 |
| JP | 04054336 | 2/1992 |
| JP | 09020267 A | 1/1997 |
| JP | 2006247237 A | 9/2006 |
| WO | 2005100100 A1 | 10/2005 |
| WO | 2005105554 A1 | 11/2005 |
| WO | 2006065868 A2 | 6/2006 |
| WO | 2006119225 A2 | 11/2006 |
| WO | 2006136743 A1 | 12/2006 |
| WO | 2008016653 A2 | 2/2008 |
| WO | 2010103449 A1 | 9/2010 |
| WO | 2012014091 A1 | 2/2012 |
| WO | 2012042396 A1 | 4/2012 |
| WO | 2013007386 A1 | 1/2013 |

OTHER PUBLICATIONS

European Patent No. 1369309 (A1); Publication Date: Dec. 10, 2003; English Machine Translation; 13 pages.
European Patent No. 1419936 (A1); Publication Date: May 19, 2004; Abstract Only; 1 Page.
European Patent No. 1473197 (A1); Publication Date: Nov. 3, 2004; Abstract Only; 1 Page.
European Patent No. 1652733 (A1); Publication Date: May 3, 2006; Abstract Only; 1 Page.
European Patent No. 1759959 (A2); Publication Date: Mar. 7, 2007; Abstract Only; 1 Page.
European Patent No. 1759959 (A2); Publication Date: Mar. 7, 2007; Machine Translation; 18 Pages.
European Patent No. 2380782 (A1); Publication Date: Oct. 26, 2011; Abstract Only; 2 Pages.
French Patent No. 2702432 (A1); Publication Date: Sep. 16, 1994; Abstract Only; 1 Page.
French Patent No. 2859970 (A1); Publication Date: Mar. 25, 2005; Abstract Only; 1 Page.
French Patent No. 2864811 (A1); Publication Date: Jul. 8, 2005; Abstract Only; 1 Page.
French Patent No. 2887508 (A1); Publication Date: Dec. 29, 2006; Abstract Only; 1 Page.
German Patent No. 102007038087 (A1); Publication Date: Feb. 12, 2009; Abstract Only; 1 Page.
German Patent No. 102011104368 (A1); Publication Date: Mar. 15, 2012; Abstract Only; 1 Page.
International Publication No. 2005100100 (A1); Publication Date: Oct. 27, 2005; Abstract Only; 1 Page.
International Publication No. 2006136743 (A1); Publication Date: Dec. 28, 2006; Abstract Only; 2 Pages.
International Publication No. 2013007386 (A1); Publication Date: Jan. 17, 2013; Abstract Only; 1 Page.
International Search Report; International Application No. PCT/US2014/011875; International Filing Date: Jan. 16, 2014; Date of Mailing: Mar. 6, 2014; 6 Pages.
Japanese Patent No. 09020267 (A); Publication Date: Jan. 21, 1997; Abstract Only; 1 Page.

(56) References Cited

OTHER PUBLICATIONS

Japanese Patent No. 2006247237 (A); Date of Publication: Sep. 21, 2006; Abstract Only; 1 Page.
U.S. Appl. No. 12/973,184, filed Dec. 20, 2010; "Reinforced Body in White and Method of Making and Using the Same".
U.S. Appl. No. 13/745,208, filed Jan. 18, 2013; "Reinforced Body in White and Method of Making and Using the Same".

Witteman, Willibroordus J.; "Improved Vehicle Crashworthiness Design by Control of the Energy Absorption of Different Collision Situations"; Dictoral Dissertation, Eindhoven University of Technology; 1999; 191 Pages.
Written Opinion of the International Searching Authority; International Application No. PCT/US2014/011875; International Filing Date: Jan. 16, 2014; Date of Mailing: Mar. 6, 2014; 6 Pages.

\* cited by examiner

POLYMER, ENERGY ABSORBER RAIL EXTENSION, METHODS OF MAKING AND VEHICLES USING THE SAME

CROSS REFERENCE TO RELATED APPLICATIONS

The present application is a continuation of U.S. patent application Ser. No. 13/745,180, filed Jan. 18, 2013, the contents of which are hereby incorporated by reference in its entirety.

BACKGROUND

The present disclosure relates generally to a polymer energy absorbing rail extension.

Bumper systems generally extend widthwise, or transverse, across the front and rear of a vehicle and are mounted to rails that extend in a lengthwise direction. Many bumper assemblies for an automotive vehicle include a bumper beam and an injection molded energy absorber secured to the bumper beam with a fascia covering the energy absorber.

Beneficial energy absorbing bumper systems achieve high efficiency by building load quickly to just under the load limit of the rails and maintain that load constant until the impact energy has been dissipated. Energy absorbing systems attempt to reduce vehicle damage as a result of a collision by managing impact energy absorption. Bumper system impact requirements are set forth by United States Federal Motor Vehicle Safety Standards (US FMVSS), Canadian Motor Vehicle Safety Standards (CMVSS), European EC E42 consumer legislation, EuroNCAP pedestrian protection requirements, Allianz impact requirements, and Asian Pedestrian Protection for lower and upper legs. In addition, the Insurance Institute for Highway Safety (IIHS) has developed different barrier test protocols on both front and rear bumper systems. These requirements must be met for the various design criteria set forth for each of the various automotive platforms and car models. If there is even very limited damage to any component of the frame of the vehicle, costs of repairing the vehicle can escalate dramatically.

This generates the need to develop low cost, lightweight, and high performance energy absorbing systems that will deform and absorb impact energy to ensure a good vehicle safety rating and reduce vehicle damage in low speed collisions. Different components due to their inherent geometry and assembly requirements need different energy absorber designs to satisfy the impact criteria. Therefore, the automotive industry is continually seeking economic solutions to improve the overall safety rating of a vehicle. Hence, there is a continual need to provide a solution that would reduce vehicle damage and/or enhance a vehicle safety rating.

BRIEF DESCRIPTION

Disclosed, in various embodiments, are energy absorbing rail extensions, methods for making and vehicles using the same.

In one embodiment, a rail extension comprises: an energy absorber comprising a polymer body, wherein the energy absorber comprises cells formed by cell walls extending a length of the energy absorber and forming cavities therethrough; each side of the energy absorber comprises an open channel wherein the channel is defined by walls of adjacent cells; a vehicle attachment tab extending from at least one of the cell walls at one end of the energy absorber; and a first vehicle attachment tab gusset extending between the vehicle attachment tab and the cell wall on one side of an opening in the vehicle attachment; wherein the energy absorber and the vehicle attachment tab were formed as one-piece.

In one embodiment, a vehicle can comprise: a bumper beam; a vehicle rail; and a rail extension. The rail extension comprising an energy absorber comprising a polymer body, wherein the energy absorber comprises cells formed by cell walls extending a length of the energy absorber and forming cavities therethrough; each side of the energy absorber comprises an open channel, wherein the channel is defined by walls of adjacent cells; a vehicle attachment tab extending from at least one of the cell walls at one end of the energy absorber; and a first vehicle attachment tab gusset extending between the vehicle attachment tab and the cell wall on one side of an opening in the vehicle attachment; wherein the energy absorber and the vehicle attachment tab were formed as one-piece.

In one embodiment, a method of controlling a crushing of a vehicle extension, comprising: determining an initial force peak during crushing of the energy absorber; beveling a surface of some cells based upon the initial force peak; and changing the angle of the bevel until the initial force peak is less than a desired maximum force; forming a one-piece rail extension. The rail extension comprising: an energy absorber comprising a polymer body, wherein the energy absorber comprises cells formed by cell walls extending a length of the energy absorber and forming cavities therethrough; each side of the energy absorber comprises an open channel, wherein the channel is defined by walls of adjacent cells; a vehicle attachment tab extending from at least one of the cell walls at one end of the energy absorber; and a first vehicle attachment tab gusset extending between the vehicle attachment tab and the cell wall on one side of an opening in the vehicle attachment; wherein the energy absorber and the vehicle attachment tab were formed as one-piece.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Disclosed herein, in various embodiments, are energy absorbing devices which can be used in conjunction with vehicle components, e.g., to minimize the damage suffered during an impact. Although it is envisioned that the energy absorbing rail extensions can comprise metal inserts (e.g., strategically located metal reinforcements), these elements can be wholly polymer elements (besides attachment inserts that can be located in tabs configured to be attached to the vehicle). The energy absorption section of the extensions are desirably configured to, during impact, maintain a substantially constant force (e.g., will vary by less than or equal to 20%). In other words, if the desired constant force is 100 kN, the variation will not exceed 80 kN to 120 kN. It is also noted, that, desirably, during an impact, the energy absorption section imparts a force that exceeds the constant force (e.g., the maximum desired force) by less than or equal to 20%, specifically, less than or equal to 10%, and more specifically, less than or equal to 5%. In other words, if the desired constant force is 100 kN, desirably, during an impact, the energy absorption section imparts a force that is less than or equal to 120 kN, specifically, less than or equal to 110 kN, and more specifically, less than or equal to 105 kN. It is understood that the forces exerted by the energy absorption section are exerted during an impact sufficient to crush the energy absorption section, until the energy absorption section is crushed.

In addition to maintaining a substantially constant force during crushing, the rail extension desirably crushes completely and does not exceed a force during crushing over the force limit for the vehicle. The minimum force on the rail extensions that will initiate crushing is dependent upon the strength of the rails. Generally, the minimum force to initiate crushing is greater than or equal to 60 kN, specifically, greater than or equal to 70 kN, and more specifically, greater than or equal to 80 kN. In other words, the force during impact is maintained below the force limit of the rails so that the rails do not fail or deform before the rail extensions fully crush.

The rail extensions can have multiple cells and can be alveolar structures more commonly referred to as "honeycomb". The combs of the structure can be any polygonal or rounded shape, such as circular, oval, square, rectangular, triangular, diamond, pentagonal, hexagonal, heptagonal, and octagonal geometries as well as combinations comprising at least one of the foregoing geometries. Structures wherein the length of the sides are equal (besides a difference caused by the curvature of the angle formed by adjacent sides) have been particularly useful in obtaining the desired crush characteristics. In other words, substantially square cells having rounded or 90 degree corners have been particularly useful.

The material of the rail extension can be any thermoplastic material or combination of thermoplastic materials that can be formed into the desired shape and provide the desired properties. Examples of polymers include thermoplastic materials as well as combinations of thermoplastic materials elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the polymer can comprise Xenoy™ resin, and/or Noryl™ GTX resin, which is commercially available from SABIC. The polymer can optionally be reinforced, e.g., with fibers, particles, flakes, as well as combinations comprising at least one of the foregoing, for example, glass fibers, carbon fibers, and combinations comprising at least one of the foregoing. For example, the plastic insert can be formed from STAMAX™ materials, a long glass fiber reinforced polypropylene commercially available from SABIC. The extension can also be made from combinations comprising at least one of any of the above-described materials and/or reinforcements, e.g., a combination with a thermoset material.

The overall size, e.g., the specific dimensions of the rail extension will depend upon the particular vehicle, the desired crush characteristics, and the space available. For example, the length (l), height (h), and width (w) of the rail extension, will depend upon the amount of space available between the rail and the bumper beam of the vehicle as well as crush characteristics (e.g., desired displacement). (See FIG. 1) The design of the cells, the angle and existence of chamfered section, and the thickness of the cell walls will depend upon the desired crush characteristics (e.g., maximum force exerted by the rail extension during an impact (e.g., while crushing)). The length, l, of the rail extension can be less than or equal to 300 mm, specifically, 50 mm to 250 mm, and more specifically 100 mm to 200 mm (e.g., 150 mm). The width, w, of the energy absorbing device can be less than or equal to 200 mm, specifically, 20 mm to 150 mm, and more specifically 40 mm to 100 mm. The height, h, of the energy absorbing device can be less than or equal to 300 mm, specifically, 60 mm to 200 mm, and more specifically 80 mm to 150 mm. The length is greater than or equal to the height which is greater than or equal to the width. The length, height, and width measurements are the broadest measurement in the specified direction, excluding vehicle attachment tabs. The thickness of the cell walls can be up to 5.0 mm, specifically, 2.0 mm to 4.5 mm, and more specifically 3.0 mm to 4.0 mm.

As with the dimensions of the components, the number of cells is dependent upon the desired stiffness, crush characteristics, and materials employed. For example, the rail extension can have up to 50 cells or more, specifically, 5 to 25 cells, more specifically, 8 to 15 cells.

The rail extensions disclosed herein are configured to absorb a significant amount of impact energy when subjected to axial loading while also having acceptable creep performance (i.e., less deformation upon impact). For example, the rail extension can have a creep performance when subjected to 4.5 megaPascals (MPa) stress loading for 600 hours at 90° C. of negligible deformation (less than or equal to 5 mm, specifically, less than or equal to 3 mm, and more specifically, less than or equal to 1 mm).

The rail extensions can be produced by various molding processes, with injection molding generally employed in order to get the desired wall thickness consistency.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
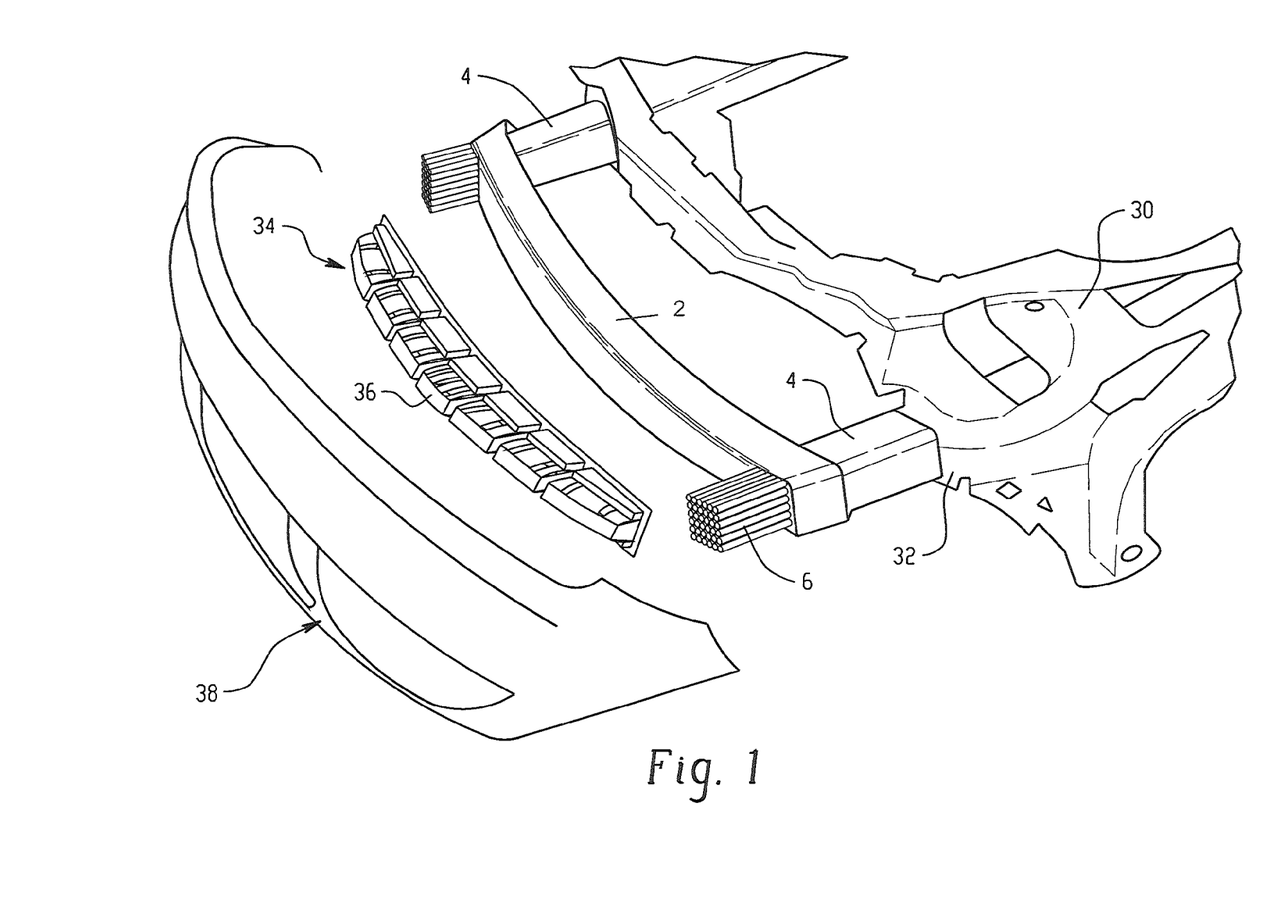
FIG. 1 is a perspective, partial view of an embodiment of a body-in-white (BIW) with polymer rail extensions located between the bumper beam and the rails.

FIG. 1 is a partial prospective view of a part of a body-in-white 30, wherein rail extensions 4 are connected to the vehicle rails 32 and to the bumper beam 2. On an opposite side of the bumper beam 2 can be crash cans 6, an energy absorber 34 comprising energy absorbing crush lobes 36, and a fascia 38. Desirably, the system (e.g., the rails, rail extensions, and bumper beam) have a natural frequency.

The rail extensions can furthermore have a natural frequency that is more than the frequency of vibration loading (excitation), specifically, the natural frequency is more than or equal to 70% of the vibration loading, and more specifically, the natural frequency is more than or equal to 40% of the frequency of vibration loading.

Figure 2:
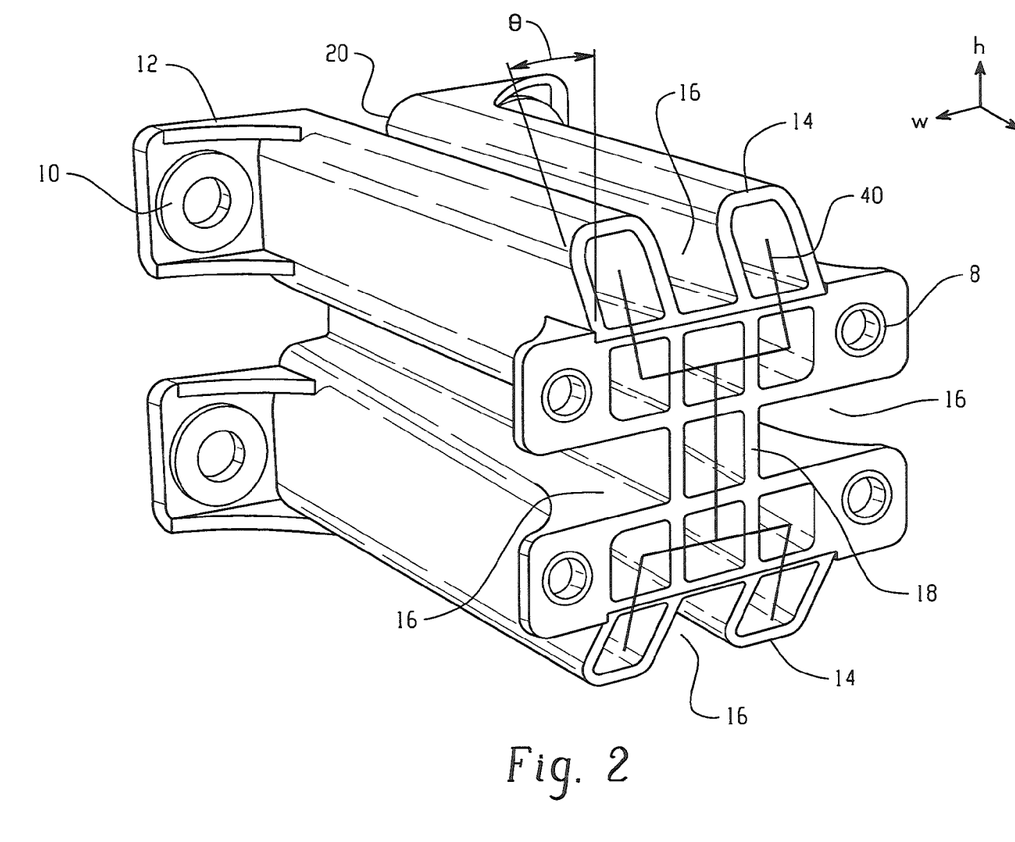
FIG. 2 is a perspective front view of an embodiment of a polymer rail extension with chamfered cells and vehicle attachments.
Figure 3:
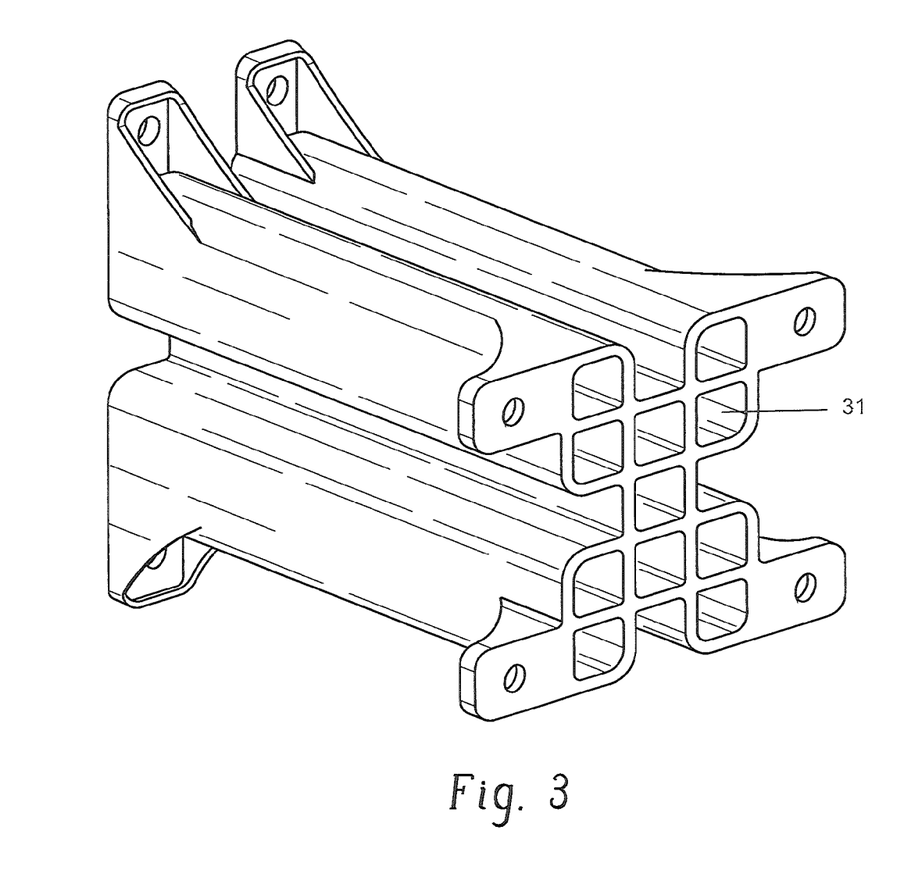
FIG. 3 is a perspective front view of another embodiment of a polymer rail extension without chamfered cells and with vehicle attachments.
Figure 4:
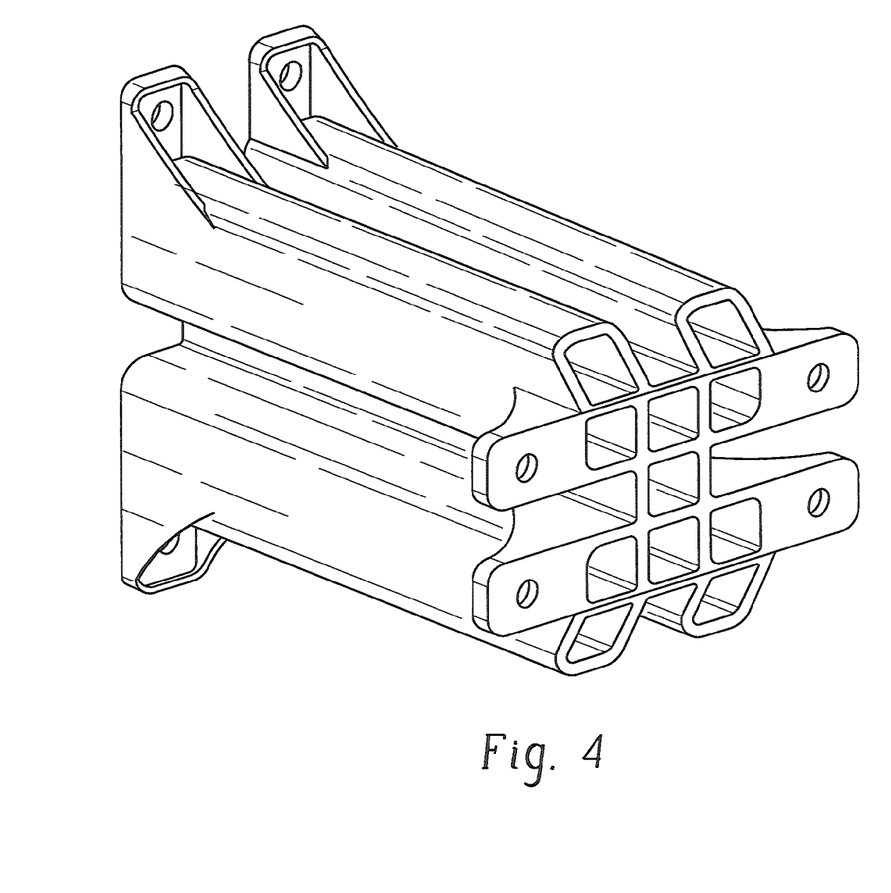
FIG. 4 is a perspective front view of yet another embodiment of a polymer rail extension with chamfered cells and vehicle attachments.
Figure 7:
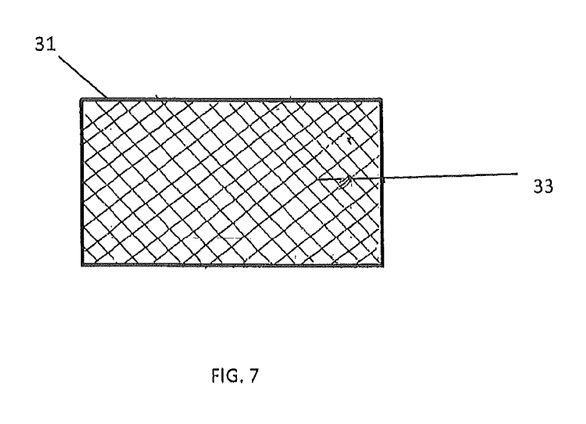
FIG. 7 is a front view of a foam filled cavity.
Figure 8:
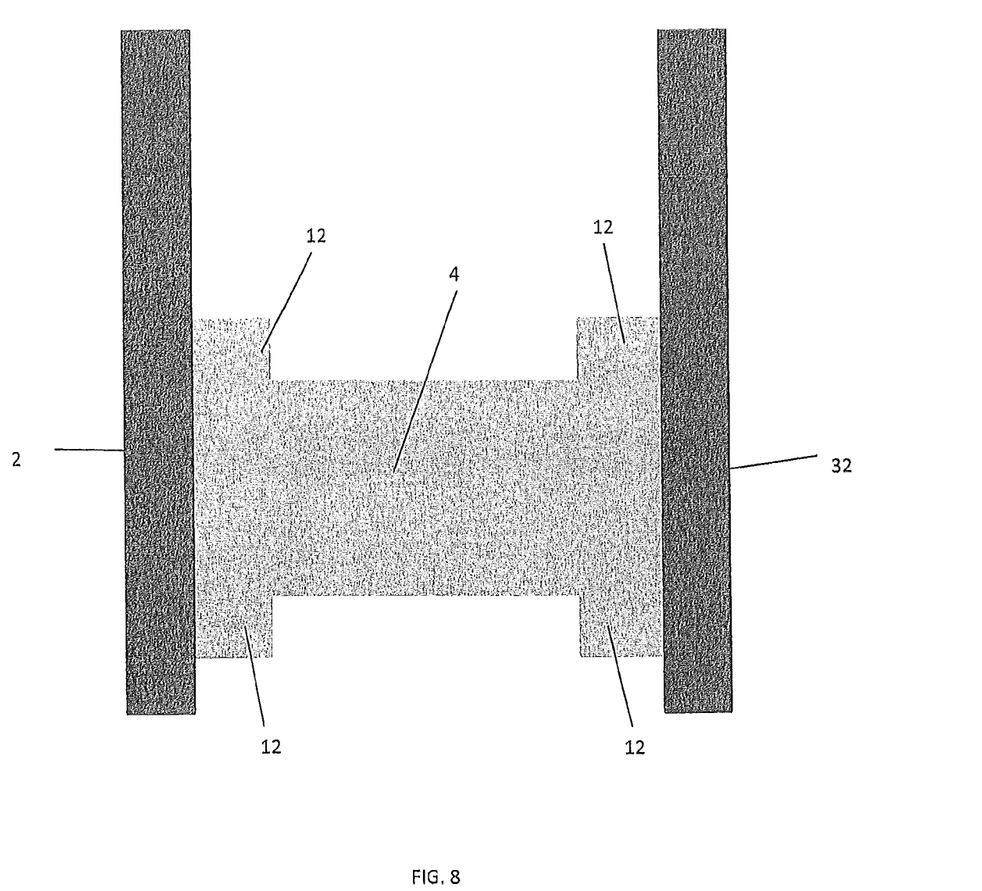
FIG. 8 is a top view of a rail extension with vehicle attachments attached to a vehicle rail and a bumper beam.

FIGS. 2-4 illustrate examples of rail extensions with different optional vehicle attachment tab locations. In these figures, it can be seen that the rail extensions can have channels 16 along two or more sides thereof. The channels 16 allow complete crushing of the extensions during an impact at an impact force of greater than or equal to 60 kN, specifically greater than or equal to 80 kN, more specifically greater than or equal to 90 kN, with the upper limit being the force limit of the rails. In other words, the middle cell for two, specifically all four, sides of the rail extension, has only 3 sides, forming an open, 3 sided channel. During crushing, the polymer of the cells is forced into the channel(s), allowing the extension to crush completely. For example, the walls start deforming and start folding in wavy manner to absorb energy during loading, once all walls are folded completely resulting in stack up (~25% of complete length of rail extension) that cannot be crushed more and load start getting transfer to rails. In other words, the extension can comprise opposing "U" shaped cell groups with cell(s) joining the bases of the "U". (See FIG. 2, design illustration 40. This particular design (e.g., combination of reverse "U") allows the walls to fold in systematic manner (e.g., a wavy pattern) to attain a complete crushing, and absorb energy during deformation. A symmetric design, in which all walls are closed, could be very stiff and not allow complete crushing. As shown in FIG. 3, the cells can run the length of the energy absorber and form cavities 31 therethrough, which can be foam 33 filled, as shown in FIG. 7.

Further tuning of the crush characteristics can be attained by beveling the outermost cells of the extension on two opposing sides to form chamfered cells 14. The beveling can be at an angle from the bumper side face 18, of greater than 0° to 45°, specifically, 10° to 40°, more specifically, 15° to 35°. The number of chamfered cells 14 is dependent upon the maximum force that can be exerted during a crash. Beveling cell(s) reduces the number of cells in physical contact with the bumper (see FIG. 1), and therefore reduces the initial force attained during an impact. The specific angle desired for a particular design can be determined by measuring the force transferred to the rails versus displacement upon a frontal crash, to determine if the maximum force is exceeded. As the angle increases, the initial force peak decreases.

As is illustrated in FIGS. 2-4, the rail extensions have vehicle attachments 12 that extend from the ends thereof. The vehicle attachments 12 extending from the front face 18 can be employed to attach the rail extension to the bumper beam. The vehicle attachments 12 extending from the rear face 20 (rail side face) can be employed to attach the rail extension to the vehicle rails. Optionally, the vehicle attachments (e.g., tabs that extend perpendicular to the length of the rail extension), can have reinforcement inserts (attachment inserts) 8,10. The reinforcement inserts 8,10 reduce the stress on the rail extension due to the attachment to the vehicle. Optionally, the attachment inserts can be metal or a different polymer than the cells. For example the reinforcement inserts 8,10 can be overmolded in the tabs so as to form integral elements of the tabs. These inserts can be metal with a hole therethrough configured to receive a bolt or the like for attachment to the vehicle.

Figure 5:
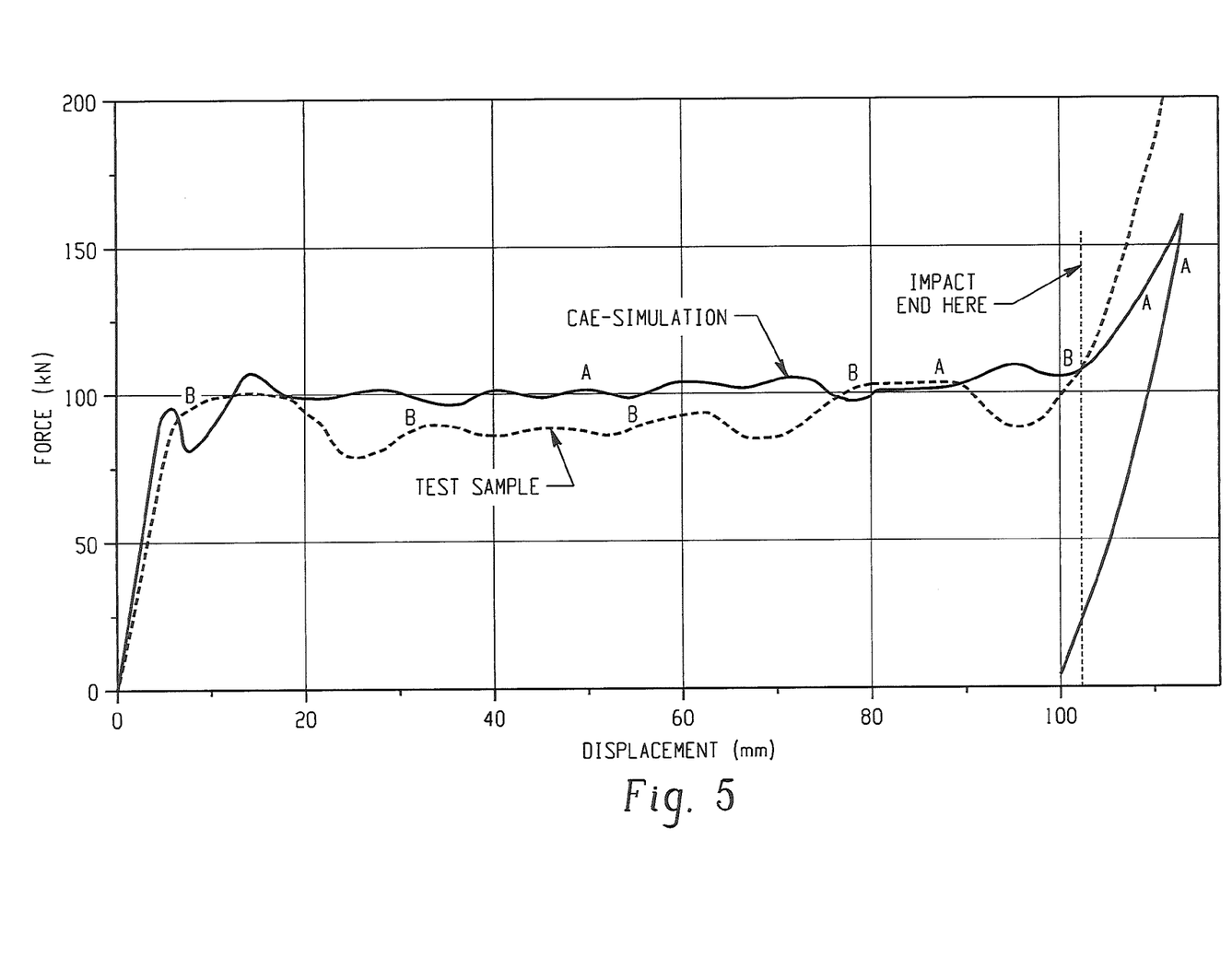
FIG. 5 is graphical representation of rail extension performance showing displacement (mm) versus force (kiloNewtons (kN)) for a simulated and a test polymer rail extensions.

FIG. 5 is a graphic illustration of displacement versus force for a simulation and for a test sample. The design of the test and the simulations were as illustrated in FIG. 2, absent the vehicle attachment tabs. The cell thickness was 3.6 mm, the chamfer angle $\theta$ was 30°, and the material was Xenoy™ resin. As can be seen, for the test sample, the test sample maintains a force close to the maximum force (100 kN), without substantially exceeding the maximum force (also referred to as the nominal force). In other words, the force during the crushing, to a complete crushing of 100 mm, is 80 kN to 105 kN. Furthermore, the peak force does not exceed 105 kN; i.e., when the initial force is applied, and the rail extension begins to crush (e.g., displacement of less than or equal to 20 mm, the force does not exceed 105 kN).

Figure 6:
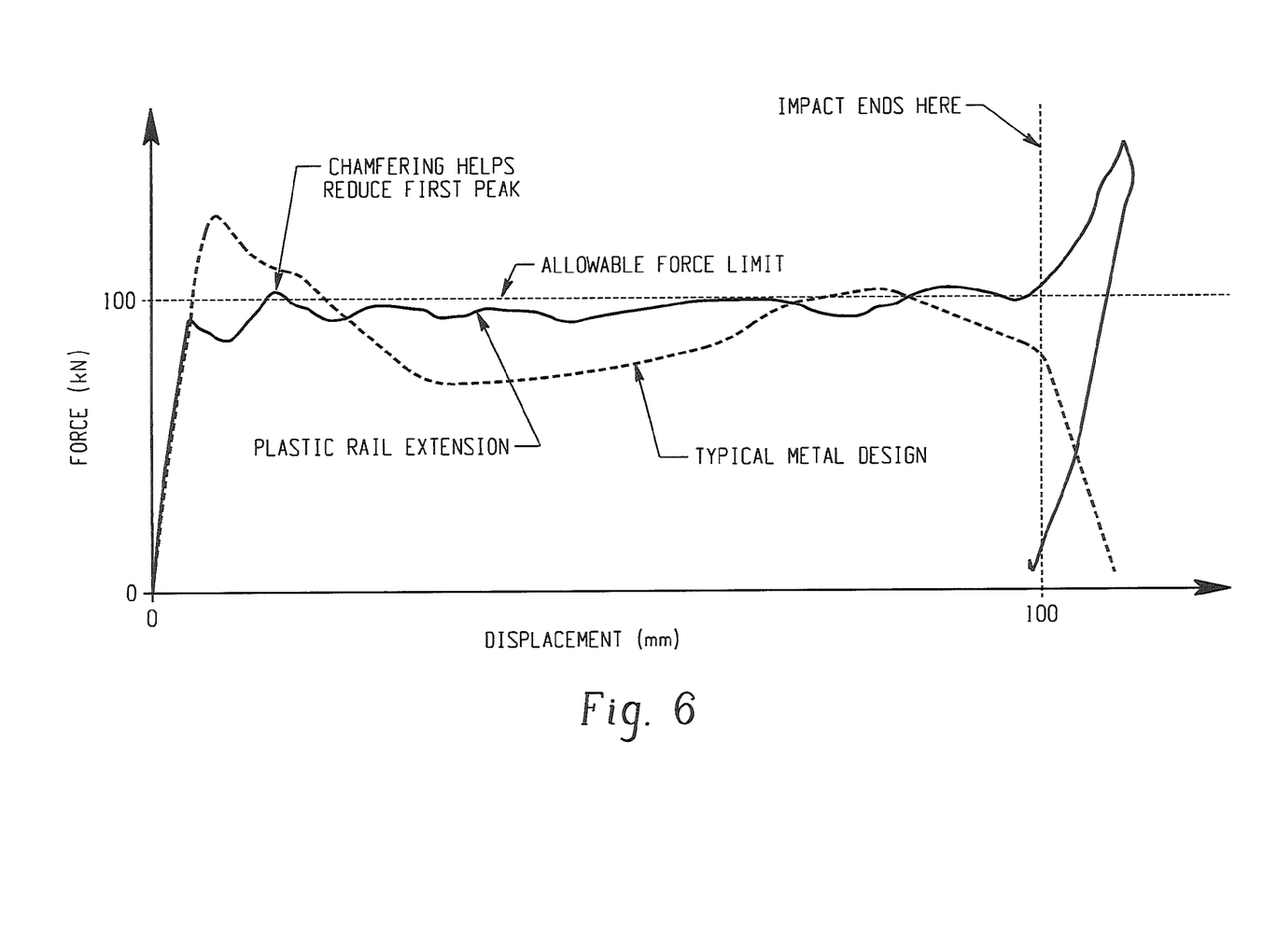
FIG. 6 is graphical representation of rail extension performance showing displacement (mm) versus force (kN)) for the simulated polymer rail extension of FIG. 5 versus a metal rail extension.

FIG. 6 is a graphic illustration of displacement versus force for a simulation of the present plastic rail extension (from FIG. 5) and for a metal rail extension. As can be seen, for the test sample, the test sample maintains a force close to the maximum force (100 kN), without substantially exceeding the maximum force, especially during the initial peak. In contrast, the metal rail extension significantly exceed the maximum force during the initial peak. Such crush characteristics can result in damage to or failure of the rails.

It is noted that 100 kN is provided as the maximum force for these particular examples, however, the actual maximum force can be different and is dependent upon the maximum force that can be applied to the rail before it begins to crush. The force peak of the rail extension and the variability of the force during displacement can be tuned (e.g., adjusted), by adjusting the thickness of the cells, the design of the cells, and the bevel of the outermost cells in contact with the bumper beam.

Desirably, the rail extension has a force during crushing of 0.60x to 1.05x, specifically, 0.75x to 1.03x, and more specifically, 0.80x to x, wherein "x" is the maximum force of the rail before it will begin crushing.

Set forth below are some embodiments of the rail extension, vehicles comprising the rail extensions, and methods of making the rail extension.

Embodiment 1 a rail extension, comprises: an energy absorber comprising a polymer body, and vehicle attachment tabs extending from one end of the energy absorber and configured to attach to a vehicle rail, and an attachment tab extending from another end of the energy absorber and configured to attach to a bumper beam. The energy absorber can comprise cells formed by cell walls extending a length of the energy absorber and forming cavities therethrough; and open channels formed on each side of the energy absorber, wherein the channels are defined by walls of adjacent cells.

Embodiment 2

The rail extension of Embodiment 1, wherein the energy absorber consists of a polymer body.

Embodiment 3

The rail extension of any of Embodiments 1-2, wherein cells adjacent to channels on two opposing sides of the energy absorber have a beveled surface.

Embodiment 4

The rail extension of Embodiment 3, wherein the beveled surface has a chamfer angle $\theta$ of greater than 0 to 45°.

Embodiment 5

The rail extension of Embodiment 4, wherein the chamfer angle $\theta$ is greater than 15° to 35°.

Embodiment 6

The rail extension of any of Embodiments 1-5, wherein the energy absorber has a width and a height, and wherein the length of less than or equal to 300 mm, the width, w, of less than or equal to 200 mm, and the height, h, of less than or equal to 300 mm, wherein the length is greater than or equal to the height which is greater than or equal to the width.

Embodiment 7

The rail extension of Embodiment 6, wherein the length, l, is 50 mm to 250 mm, the width, w, is 20 mm to 150 mm, and the height, h, is 60 mm to 200 mm.

Embodiment 8

The rail extension of any of Embodiments 1-7, wherein a thickness of the cell walls is up to 5.0 mm.

Embodiment 9

The rail extension of Embodiment 8, wherein the thickness of the cell walls is 2.0 mm to 4.5 mm.

Embodiment 10

The rail extension of any of Embodiments 1-9, wherein the rail extension has a force during crushing of 0.60x to 1.05x, wherein "x" is the maximum force of the vehicle rail before it will begin crushing.

Embodiment 11

The rail extension of Embodiment 10, wherein the force during crushing is 0.75x to 1.03x.

Embodiment 12

The rail extension of any of Embodiments 1-11, wherein the cavities comprise foam.

Embodiment 13

The rail extension of any of Embodiments 1-12, wherein, during an impact, the rail extensions begin crushing upon an impact of greater than or equal to 60 kN.

Embodiment 14

The rail extension of any of Embodiments 1-13, wherein, during an impact, the rail extensions have a first peak force of less than or equal to 110% of a force limit of a rail to which the rail extension is attached.

Embodiment 15

A vehicle can comprise: a bumper beam; a vehicle rail; the rail extension of any of Embodiments 1-14.

Embodiment 16

The vehicle of Embodiment 15, further comprising a vehicle energy absorber comprising crush lobes, wherein the bumper beam is between the vehicle energy absorber and the rail extension; and a fascia, wherein the energy absorber is located between the bumper beam and the fascia.

Embodiment 17

The vehicle of any of Embodiments 15-16, wherein an system comprising the bumper beam, rail extension, and rail, has a normal loading frequency that is less than a natural frequency of the system.

Embodiment 18

The vehicle of Embodiment 17, wherein the normal loading frequency is less than our equal to 75% of the natural frequency.

Embodiment 19

The vehicle of Embodiment 17, wherein the normal loading frequency is less than our equal to 60% of the natural frequency.

Embodiment 20

A method of controlling a crushing of a vehicle extension, can comprise: forming a rail extension, the a rail extension comprising an energy absorber comprising a polymer body, wherein the energy absorber comprises cells formed by cell walls extending a length of the energy absorber and forming cavities therethrough; forming open channels along the outside of the rail extension; determining an initial force peak during crushing of the energy absorber; beveling a surface of some cells based upon the initial force peak; changing the angle of the bevel until the initial force peak is less than a desired maximum force.

Embodiment 21

The method of Embodiment 20, further comprising filling some of the cavities with foam.

Embodiment 22

The method of Embodiment 20, further comprising filling all of the cavities with foam.

Embodiment 23

The method of any of Embodiments 20-22, wherein the maximum force is less than or equal to 110% of a force limit of a rail to which the rail extension will be attached to.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A rail extension, comprising
    an energy absorber comprising a polymer body, wherein the energy absorber comprises cells formed by cell walls extending a length of the energy absorber and forming cavities therethrough;
    each side of the energy absorber comprises a substantially U-shaped open channel extending a length of the energy absorber, wherein the channel is defined by walls of adjacent cells;
    a vehicle attachment tab extending from at least one of the cell walls at one end of the energy absorber; and
    a first vehicle attachment tab gusset extending between the vehicle attachment tab and the cell wall on one side of an opening in the vehicle attachment tab;
    wherein the energy absorber and the vehicle attachment tab were formed as one-piece.

2. The rail extension of claim 1, further comprising a second vehicle attachment tab gusset extending between the vehicle attachment tab and the cell wall on an opposite side of the opening in the vehicle attachment tab from the first vehicle attachment tab gusset.

3. The rail extension of claim 1, further comprising a bumper attachment tab extending from at least one of the cell walls at another end of the energy absorber and configured to attach to a bumper beam.

4. The rail extension of claim 3, further comprising
    a bumper attachment tab gusset extending between the bumper attachment tab and the cell wall on one side of an opening in the bumper attachment tab;
    wherein the energy absorber, the vehicle attachment tab, the bumper attachment tab, the vehicle attachment tab gusset, and the bumper attachment tab gusset were formed as one-piece.

5. The rail extension of claim 1, wherein the energy absorber consists of a polymer body.

6. The rail extension of claim 1, wherein cells adjacent to channels on two opposing sides of the energy absorber have a beveled surface.

7. The rail extension of claim 6, wherein the beveled surface has a chamfer angle $\theta$ of greater than 0 up to an angle $\theta$ of 45°.

8. The rail extension of claim 7, wherein the chamfer angle $\theta$ is 15° to 35°.

9. The rail extension of claim 1, wherein the energy absorber has a length, l, a width, w, and a height, h, and wherein the length, l, is less than or equal to 300 mm, the width, w, of less than or equal to 200 mm, and the height, h, of less than or equal to 300 mm, wherein the length is greater than or equal to the height which is greater than or equal to the width.

10. The rail extension of claim 9, wherein, during an impact, the rail extensions begin crushing upon an impact of greater than or equal to 60 kN.

11. The rail extension of claim 1, wherein, during an impact, the rail extensions have a first peak force of less than or equal to 110% of a force limit of a rail to which the rail extension is attached.

12. A vehicle, comprising,
    a bumper beam;
    a vehicle rail;
    a rail extension comprising
        an energy absorber comprising a polymer body, wherein the energy absorber comprises cells formed by cell walls extending a length of the energy absorber and forming cavities therethrough;
        each side of the energy absorber comprises a substantially U-shaped open channel extending a length of the energy absorber, wherein the channel is defined by walls of adjacent cells;
        a vehicle attachment tab extending from at least one of the cell walls at one end of the energy absorber; and
        a first vehicle attachment tab gusset extending between the vehicle attachment tab and the cell wall on one side of an opening in the vehicle attachment tab;
        wherein the energy absorber and the vehicle attachment tab were formed as one-piece.

13. The vehicle of claim 12, further comprising a second vehicle attachment tab gusset extending between the vehicle attachment tab and the cell wall on an opposite side of the opening in the vehicle attachment tab from the first vehicle attachment tab gusset.

14. The vehicle of claim 12, further comprising a bumper attachment tab extending from at least one of the cell walls at another end of the energy absorber and configured to attach to a bumper beam.

15. The vehicle of claim 14, further comprising
    a bumper attachment tab gusset extending between the bumper attachment tab and the cell wall on one side of an opening in the bumper attachment tab;

wherein the energy absorber, the vehicle attachment tab, the bumper attachment tab, the vehicle attachment tab gusset, and the bumper attachment tab gusset were formed as one-piece.

16. A method of controlling a crushing of a vehicle extension, comprising:
   determining an initial force peak during crushing of the energy absorber;
   beveling a surface of some cells based upon the initial force peak; and
   changing the angle of the bevel until the initial force peak is less than a desired maximum force;
   forming a one-piece rail extension, the rail extension comprising:
      an energy absorber comprising a polymer body, wherein the energy absorber comprises cells formed by cell walls extending a length of the energy absorber and forming cavities therethrough;
      each side of the energy absorber comprises a substantially U-shaped open channel extending a length of the energy absorber, wherein the channel is defined by walls of adjacent cells;
      a vehicle attachment tab extending from at least one of the cell walls at one end of the energy absorber; and
      a first vehicle attachment tab gusset extending between the vehicle attachment tab and the cell wall on one side of an opening in the vehicle attachment tab;
      wherein the energy absorber and the vehicle attachment tab were formed as one-piece.

17. The method of claim 16, further comprising filling some of the cavities with foam.

18. The method of claim 16, wherein the rail extension further comprises forming a bumper attachment tab extending from at least one of the cell walls at another end of the energy absorber and configured to attach to a bumper beam.

19. The method of claim 18, further comprising forming a bumper attachment tab gusset extending between the bumper attachment tab and the cell wall on one side of an opening in the bumper attachment tab; wherein the energy absorber, the vehicle attachment tab, the bumper attachment tab, the vehicle attachment tab gusset, and the bumper attachment tab gusset were formed as one-piece.

* * * * *